O. J. EISELE.
ROTARY INTERNAL COMBUSTION ENGINE.
APPLICATION FILED JUNE 4, 1919.

1,333,204.

Patented Mar. 9, 1920.
5 SHEETS—SHEET 1.

Inventor,
Otto J. Eisele
By Frederick V. Winters
Attorney.

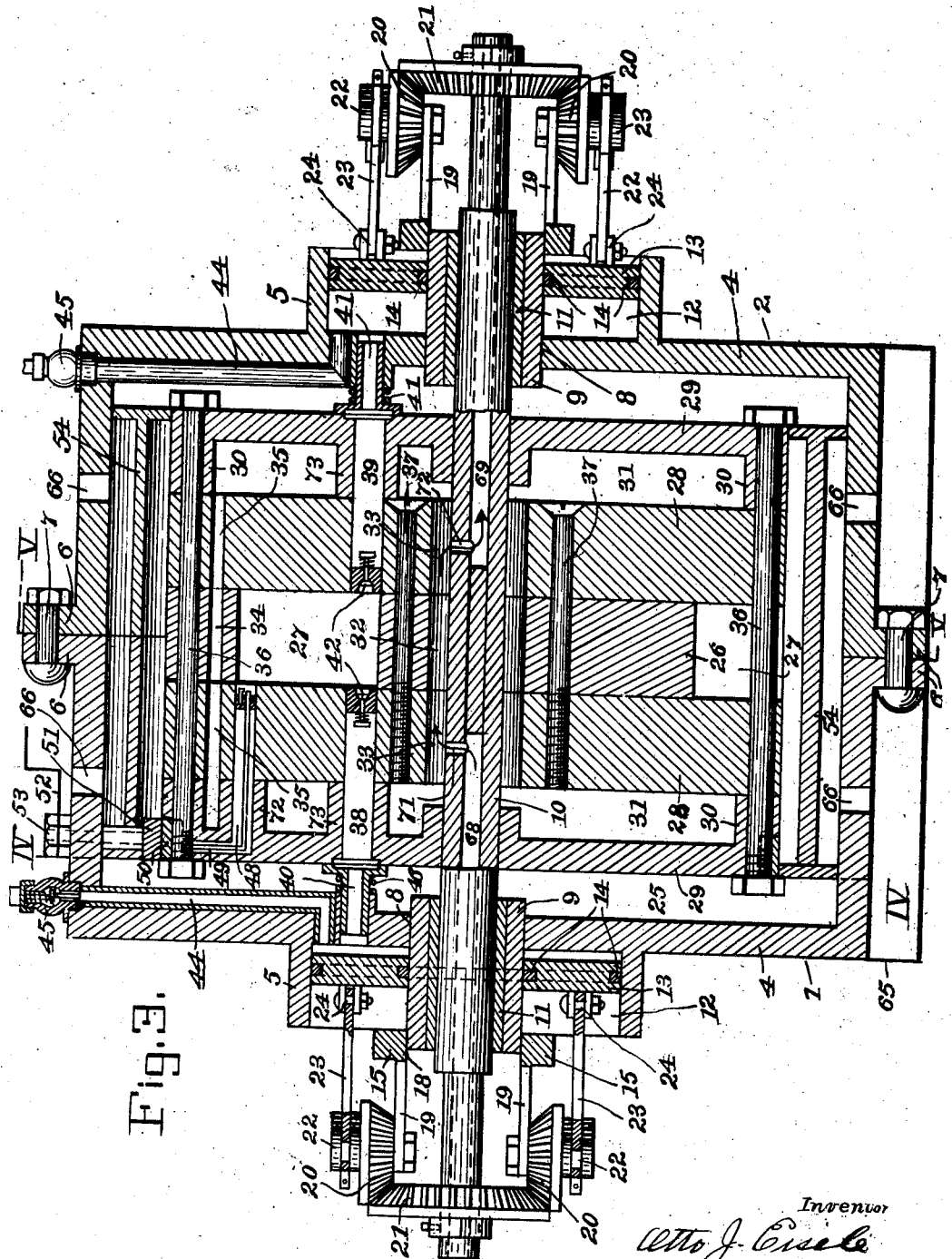

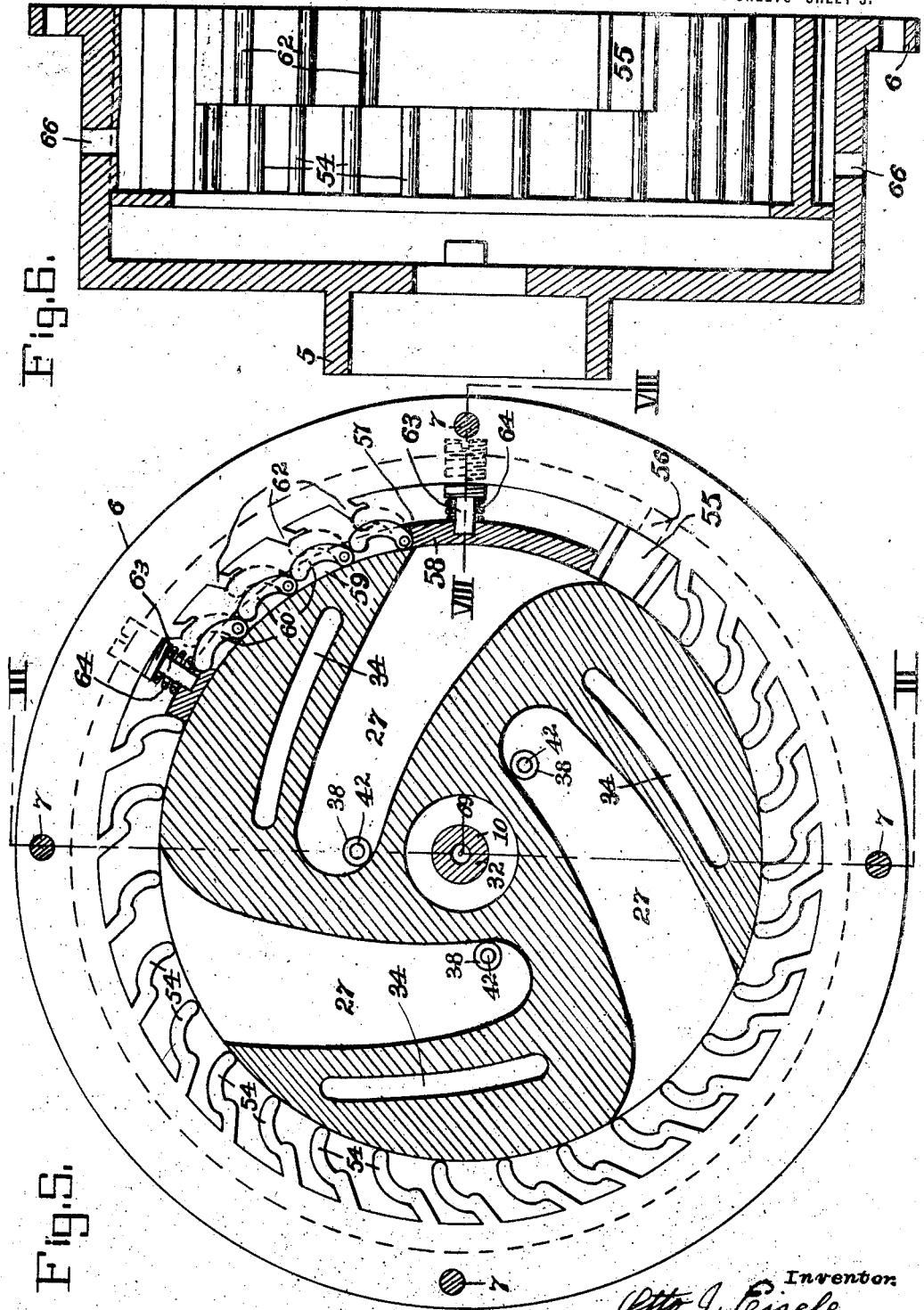

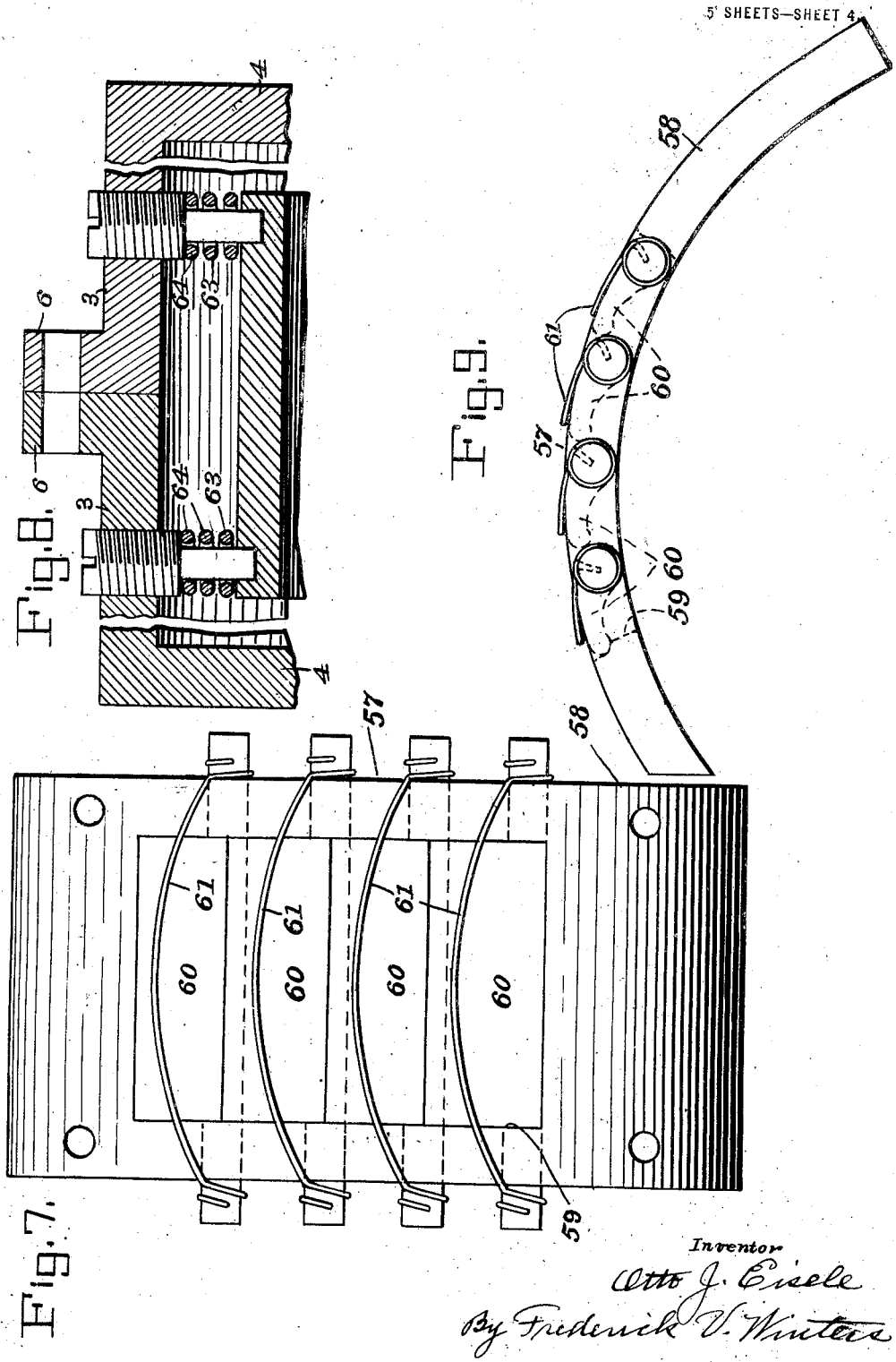

UNITED STATES PATENT OFFICE.

OTTO J. EISELE, OF NEW YORK, N. Y.

ROTARY INTERNAL-COMBUSTION ENGINE.

1,333,204.　　　　　　　Specification of Letters Patent.　　Patented Mar. 9, 1920.

Application filed June 4, 1919. Serial No. 301,655.

*To all whom it may concern:*

Be it known that I, OTTO J. EISELE, a citizen of the United States, residing at New York, in the county and State of New York, have invented certain new and useful Improvements in Rotary Internal-Combustion Engines, of which the following is a full, clear, and exact specification.

This invention relates to rotary internal combustion engines, and has for its object to provide a structure which is more simple in construction and more effective in operation than such engines as heretofore made.

It is also the aim of the invention to improve the water cooling system, and simplify the means for charging the combustion chambers in the rotary piston, and the sparking mechanism. Another object is to improve the construction of the abutments or buckets against which the explosive force of the gas acts when ignited in the combustion chambers. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Fig. 3 is a central vertical section through the engine from end to end, as on the line III—III, Fig. 5.

Fig. 5 is a section on the line V—V of Fig. 3.

Fig. 6 is a detailed central section of one of the suplemental sections of the casing of the engine, the section being taken axially.

Fig. 7 is an outside plan view of the movable bucket carrying plate drawn to a larger scale.

Fig. 8 is a broken longitudinal section through the casing on the line VIII—VIII of Fig. 5.

Fig. 9 is an edge view of the plate shown in Fig. 7.

Figure 1:
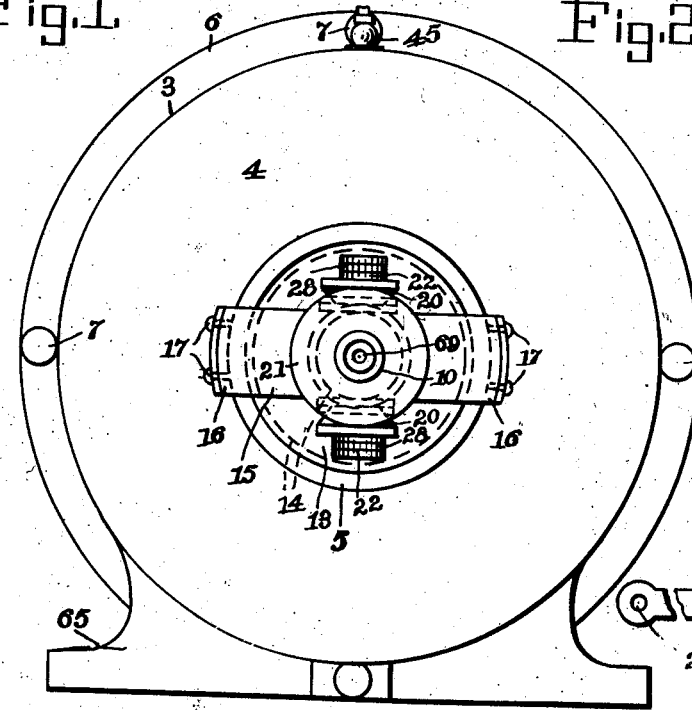
Figure 1 is an end view of a rotary internal combustion engine constructed substantially in accordance with this invention.

The casing of the engine comprises two supplemental members 1 and 2, each having an annular wall 3, and end wall 4, a concentric annular wall 5 extending beyond the end wall, and an annular flange 6 at its open end, as shown in Fig. 6. The sections or members 1 and 2 are secured together by bolts 7 passed through said flanges 6 as best shown in Fig. 3. In the central opening 8 in the end wall of each member of the casing there is fitted a tubular bearing 9 for the shaft 10, said bearing preferably having a bushing 11. The bearing 9 also forms the inner wall of the annular pump cylinder 12 at each end of the engine, the outer wall of each of said pump cylinders being formed by the annular wall 5 on each casing member. Within each of said pump cylinders a ring-shaped piston 13 is arranged to move between the wall 5 and the tubular bearing 9. Each piston is suitably packed at its edges by packing rings 14.

Figure 2:
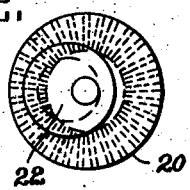
Fig. 2 is a detailed view of one of the eccentric gears for operating the fuel pumps.
Figure 14:
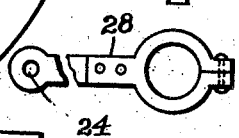
Fig. 14 is a detailed view of one of the pitmen or pump rods.

A bracket 15 is arranged horizontally across the outer end of each of the annular walls 5, as best shown in Fig. 2, said bracket having flanges 16 secured to said wall 5 by screws 17 or otherwise. Each bracket has a central opening 18 to fit around the end of the bearing 9, Fig. 3, and from the margin of said opening arms 19 extend from the bracket outwardly along but spaced from the shaft above and below the same. A bevel gear 20 is rotatably mounted on each of said arms 19 so as to face the gear on the other one, and another bevel gear 21 mounted on the shaft 10 to rotate therewith meshes with both of the gears 20. Each of said gears 20 has an eccentric member 22, Figs. 2 and 3, on which a pitman or pump rod 23, Figs. 3 and 14, is operatively mounted at one end while the other end is swiveled at 24 to the ring-shaped piston 13 of the pump. It will be noted that the eccentrics 22 are arranged to actuate the piston rods or pitmen 23 in unison, and that said rods are connected to the piston 13 at diametrically opposite points, so that said piston will be reciprocated continuously and truly as the shaft 10 revolves.

Figure 10:
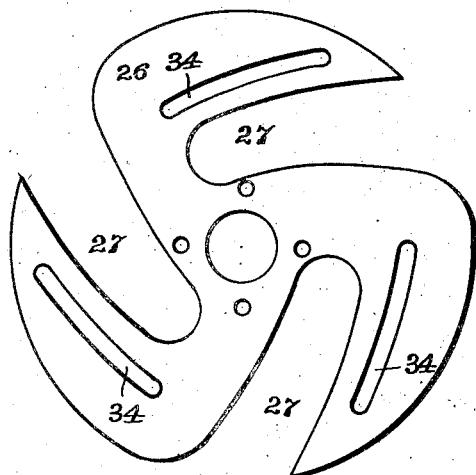
Fig. 10 is a detailed side or face view of the middle disk of the piston which contains the combustion chambers.
Figure 11:
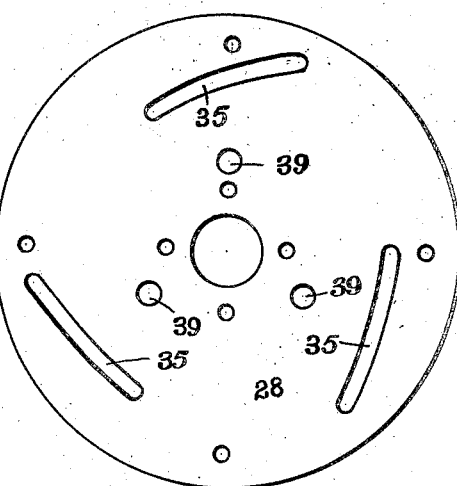
Fig. 11 is a similar view of one of the disks which are arranged on either side of said middle disk in the piston.
Figure 13:
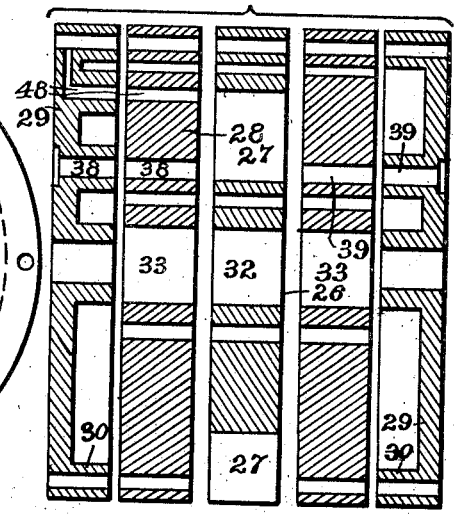
Fig. 13 is a sectional view of the several disks composing the piston in proper relative positions to be assembled.

The rotary piston 25, which is arranged to rotate freely within the casing, is composed of a plurality of disks, preferably five, as shown best in Figs. 3 and 13. The middle disk 26, Figs. 5 and 10, has a plurality of slots 27 opening on its periphery at equidistantly spaced points and constituting the combustion chambers of the piston. The two disks 28 on either side of the middle disk 26 serve to close said combustion chambers at the sides so that they open only on the periphery of the piston 25. The outer or end disks 29 have flanges 30 around their peripheries to space their body portions away from the disks 28, leaving spaces 31 between said end disks and the disks 28 which communicate with each other through enlarged bores 32 and 33 in the disks 26 and 28, respectively, and slots 34 and 35 formed respectively in the same disks and arranged to register with one another when the five disks are secured together by the bolts 36 which are passed through them axially near their peripheries. Other fastening means, as the screws 37, may be passed through the three middle disks, as best shown in Fig. 3.

Figure 12:
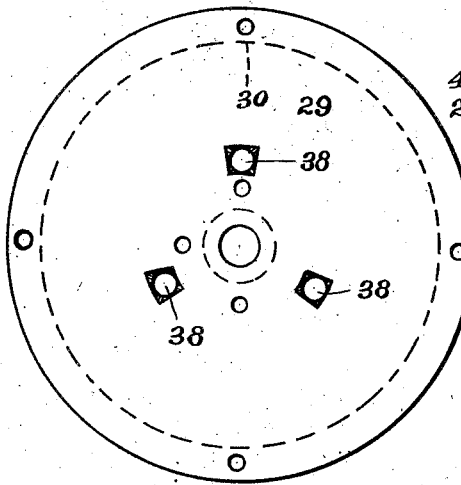
Fig. 12 is a similar view of one of the outside disks of the piston, looking at the same from the outside.

Passages 38 lead through the left hand end disk 29 and adjacent disk 28 into the combustion chambers 27, there preferably being three of said passages, one leading to each chamber. Similar passages 39 lead to said combustion chambers from the other end of the piston through the right hand end disk and adjacent disk 28, as clearly shown in Fig. 3. The outer ends of the passages 38 and 39 are arranged respectively in the path of fuel feeding nozzles 40 and 41 leading respectively from the fuel pumps at the opposite ends of the engine. Said nozzles have flared discharge ends 40ª, and the adjacent ends of the passages 38 and 39 are similarly flared at 41ª, Figs. 4 and 12, so as to effect a proper communication between said nozzles and passages when the piston is rotating rapidly. At the inner end of each passage 38 and 39 there is placed a check valve 42, Fig. 3, opening inward into the combustion chamber with which said passages communicate.

The fuel is drawn into the pumps through pipes 43 and 44, one of which is in communication with each of the pumps and which is fitted with a check valve 45 opening inwardly, so that on the outstroke of the pump as shown at the left of Fig. 3, fuel will be drawn into the pump cylinder, while on the instroke of said pump the check valve 45 will be closed permitting said fuel to be compressed in said cylinder and forced into the combustion chambers as the passages leading thereto come successively into register with the nozzles 40 and 41. Said nozzles are pressed inwardly by springs 46 to prevent leakage.

Figure 4:
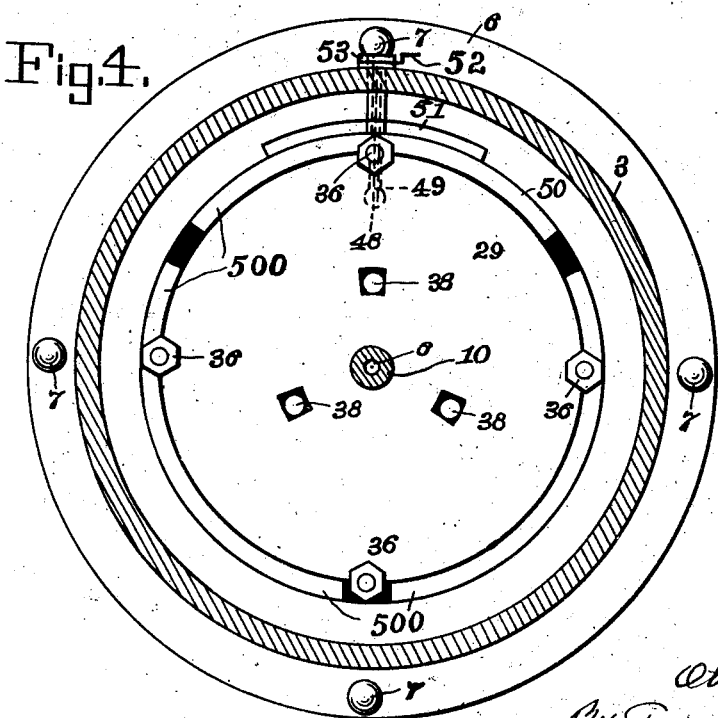
Fig. 4 is a section on the line IV—IV of Fig. 3.
Figure 15:
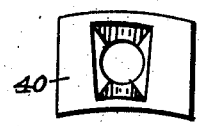
Fig. 15 is an end view of one of the fuel supply nozzles.
Figure 16:
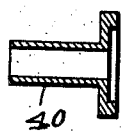
Fig. 16 is a detailed view of one of said spring pressed nozzles for supplying the fuel from the pumps to the passages in the piston leading to the combustion chambers.

The ignition of the gas in the combustion chambers is effected by means of spark plugs 47 of any suitable construction. One of said spark plugs is arranged in a passage 48 leading into each of the combustion chambers, as shown in Fig. 3. Wires 49 carrying the ignition current extend through said passages 48 and are electrically connected to a metal segmental ring or hoop 50 seated in the periphery of the piston and having direct contact with a shoe 51 carried by the casing and with which the external wires 52 of the ignition circuit are connected through the binding post 53. There are three segments 500 comprising the ring or hoop 50, as shown in Fig. 4, and each segment is insulated from the others and from the piston. Each segment controls the sparking of the plug in a different one of the combustion chambers, and each of said segments comes in contact successively with the shoe 51 as the piston revolves.

In the central portion of the casing opposite the openings of the combustion chambers there are arranged a series of abutments or buckets 54, as best shown in Figs. 5 and 6. These buckets extend about two-thirds of the way around the casing and may be made integral therewith or suitably fastened thereto so as to remain stationary while the piston rotates. When the gases are exploded in the combustion chambers which open upon said buckets or abutments, the concussion acts against them to force the piston around, as will be readily understood. In the other third of the casing not occupied by the buckets 54 there is an exhaust passage 55 leading to an exhaust port 56, and the remainder of said space is covered by a bridge or shoe 57 in the form of an arcuate plate or frame having a closed end portion 58 adapted to close the combustion chambers while they are being charged, and an opening 59 normally closed by an overlapping series of shutters 60 corresponding to the fixed abutments 54. These shutters are yieldingly held closed upon one another, as shown in Figs. 5, 7 and 9, by springs 61 attached to the hubs of said shutters and extending across the latter. When the explosion occurs, which takes place when the combustion chambers come successively opposite said shutters, the latter are forced open and swing outward until they come in contact with ribs 62 on the casing and form with said ribs the equivalents of the fixed buckets 54, see the dotted line position of the shutters in Fig. 5.

The bridge plate 57 is held in place by bolts 63 arranged at the four corners thereof, and springs 64 coiled about said bolts serve to press said plate tightly against the periphery of the piston. The casing of the engine may be mounted on any suitable base or foundation, as suggested at 65 in Figs. 1 and 3.

In operation, after the piston is started in any suitable manner, the rotation of the shaft will cause the pumps to operate through the gears 20 and 21 and eccentrics 22 and rods 23; the pistons 13 thus reciprocated drawing in the fuel and after compressing the same forcing it into the combustion chambers of the rotary piston, as already explained. The ignition of the gas thus forced into said combustion chambers is timed by any suitable mechanism (not shown) so as to cause each chamber to be fired when it comes opposite the shutters 60 in the bridge frame or plate 57, said chamber having been immediately before charged while closed by the imperforate end portion 58 of the plate, and just prior to that having been exhausted through the exhaust passage 55. The explosion which occurs opposite the shutters, after forcing them open, as already described, carries the piston around past them and any unspent gases will act upon the fixed buckets or abutments 54 to further rotate the piston. Vent openings 66 are formed in the casing to communicate with certain of the buckets for permitting the spent gases to escape. It will be noted that the abutments are formed with inclined rebent portions 67 constituting the buckets proper against which the impact of the gases is directed, so that the presence of the vent openings 66 will not nullify the action of said impact.

For cooling the piston, water is circulated through bores 68 and 69 entering the shaft 10 from opposite ends and extending to points near its center, thence through ports 70 and 71 communicating with the bores and the outside of the shaft, and thence through the spaces 31 between the end disks 29 and the adjacent disks 28 of the rotary piston, and through the enlarged bores 32 and 33 and the slots 34 and 35. The passages for the fuel and ignition wires are surrounded by bosses 72 and 73, respectively, on the end disks of the rotary piston so as to exclude the water from said passages.

As shown in Fig. 3, the pumps on the opposite ends of the casing operate alternately to draw in the fuel through the pipes 44 and feed said fuel to the combustion chambers in order. Thus, the pump at one end of the engine casing draws in the fuel while the pump at the other end is forcing the fuel from its cylinder into one of the combustion chambers. Then, when the next explosion chamber comes around opposite the feeding nozzles, the pump which had previously been drawing in the fuel forces it into said chamber to charge the same while the other pump is drawing in fuel for the third combustion chamber. When there are three combustion chambers, as illustrated, the gears 21 and 20 should be in such relation as to cause said gears 20 to turn one and a half revolutions to each revolution of the gears 21 and the shaft 10.

Having thus described my invention, what I claim as new and desire to secure by Letters Patent of the United States is:—

1. In a rotary internal combustion engine, the combination with a cylindrical piston having combustion chambers opening on its periphery, of a casing having abutments around said piston, a shaft journaled in the casing and on which the piston is fixed to rotate therewith, pumps at the opposite ends of the casing for supplying fuel alternately to said combustion chambers, means for driving said pumps from said shaft, and means for periodically igniting the fuel in the combustion chambers.

2. In a rotary internal combustion engine, the combination with a cylindrical piston having combustion chambers opening on its periphery, of a casing having abutments around said piston, a shaft carrying the piston and journaled in the casing, a pump cylinder on the end of the casing, a piston in said pump cylinder adapted to be reciprocated axially of the rotary piston and shaft, and gearing for actuating said pump piston from said shaft.

3. In a rotary internal combustion engine, the combination with a cylindrical piston having combustion chambers opening on its periphery, of a casing having abutments around said piston, a shaft carrying the piston and journaled in the casing, a pump cylinder on the end of the casing, a piston in said pump cylinder adapted to be reciprocated axially of the rotary piston and shaft, a bevel gear on said shaft, an eccentric gear meshing with said bevel gear, and a pump rod connected to the pump piston and said eccentric gear.

4. In a rotary internal combustion engine, the combination with a cylindrical piston having combustion chambers opening on its periphery, of a casing having abutments around said piston, a shaft carrying the piston and journaled in the casing, a pump cylinder surrounding said shaft, a ring-shaped piston in said pump cylinder, and gearing for imparting a reciprocating movement to said pump piston from the rotating shaft.

5. In a rotary internal combustion engine, the combination with a cylindrical piston having combustion chambers opening on its periphery, of a casing having abutments around said piston, a shaft carrying the piston and journaled in the casing, an annular wall on the casing arranged concentric with the shaft, a sleeve on the shaft within said annular wall, a ring-shaped piston fitted to be reciprocated between said sleeve and annular wall, and means for actuating said ring-shaped piston from the shaft.

6. In a rotary internal combustion engine, the combination with a cylindrical piston having combustion chambers opening on its periphery, of a casing having abutments around said piston, a shaft carrying the piston and journaled in the casing, an annular wall on the casing concentric with the shaft, a ring-shaped piston fitted to be reciprocated in said annular wall around the shaft, a bridge member secured to said annular wall and through which the shaft extends, arms on said bridge member extending along the shaft, eccentric bevel gears journaled in said arms, piston rods connected to said eccentric gears and to the ring-shaped piston, and a bevel gear on the shaft meshing with said eccentric gears.

7. In a rotary internal combustion engine, the combination with a cylindrical rotary piston having combustion chambers opening on its periphery, of a casing having abutments around said piston, a shaft carrying the piston and journaled in the casing, a pump on each end of the casing, means for conveying fuel from said pumps through each end of the casing and rotary piston into said combustion chambers, and means for periodically igniting the fuel in said chambers.

8. In a rotary internal combustion engine, the combination with a cylindrical rotary piston having combustion chambers opening on its periphery, of a casing having abutments around said piston, a shaft carrying the piston and journaled in the casing, said piston having fuel intake passages leading from said combustion chambers to the ends of said piston, and fuel supplying nozzles carried by the casing and bearing against the ends of the piston in the path of said intake passages therein.

9. In a rotary internal combustion engine, the combination with a cylindrical rotary piston having combustion chambers opening on its periphery, of a casing having abutments around said piston, a shaft carrying the piston and journaled in the casing, said piston having fuel intake passages leading from said combustion chambers to the ends of the piston, fuel supplying nozzles carried by the casing and arranged in the path of the intake passages in the ends of the piston, and resilient means for pressing said nozzles against the ends of the piston.

10. In a rotary internal combustion engine, the combination with a cylindrical rotary piston having combustion chambers opening on its periphery, of a casing having abutments around said piston, there being fuel intake passages in said piston leading into said combustion chambers from the ends of piston, and spring-pressed fuel supplying nozzles carried by the casing and pressed against the ends of the piston in the path of said intake passages, the mouths of said passages and nozzles being flared for the purpose specified.

11. In a rotary internal combustion engine, the combination with a cylindrical rotary piston having combustion chambers opening on its periphery, of a casing having abutments around said piston, there being fuel intake passages in said piston leading into the combustion chambers from the ends of the piston, fuel supplying nozzles carried by the casing and engaging the ends of the piston in the path of the intake passages, and check valves in said passages for preventing the escape of the fuel from the combustion chambers when the nozzles are not in line with said passages.

12. In a rotary internal combustion engine, the combination with a rotary piston having internal combustion chambers opening on its periphery, of a casing having abutments around the piston, there being water circulating passages in said piston between and at both sides of said chambers, and a shaft carrying the piston and journaled in the casing, said shaft having circulating passages for cooling water communicating with the passages in the piston.

13. In a rotary internal combustion engine, the combination with a rotary piston having internal combustion chambers opening on its periphery, of a casing having abutments around the piston, there being water circulating passages in said piston between and at both sides of said chambers, and a shaft carrying the piston and journaled in the casing, said shaft having a bore entering from one end and communicating with the water circulating passages in the piston, and another bore entering from the other end and also communicating with said water circulating passages in the piston.

14. In a rotary internal combustion engine, the combination with a casing having internal abutments, of a rotary piston in said casing and having internal combustion chambers opening on its periphery, said piston consisting of a plurality of disks secured together face to face, and one of the internal disks having slots constituting the combustion chambers.

15. In a rotary internal combustion engine, the combination with a casing having internal abutments, of a rotary piston in said casing and having internal combustion chambers opening on its periphery, said piston consisting of a plurality of disks secured together face to face, one of the internal disks having slots constituting the combustion chambers, and the disks on either side of said slotted internal disk forming the walls of said chambers at the sides of the slots.

16. In a rotary internal combustion engine, the combination with a casing having internal abutments, of a rotary piston in said casing and having internal combustion chambers opening on its periphery, said piston consisting of a plurality of disks secured together face to face, one of the internal disks having slots constituting the combustion chambers, the disks on either side of said slotted internal disk forming the walls of the chambers at the sides of the slots, and water circulating spaces in said disks and between the outside end disks and the one adjacent thereto.

17. In a rotary internal combustion engine, the combination with a rotary piston having combustion chambers opening on its periphery, of a casing having fixed abutments extending partially around said piston, and a series of movable overlapping abutments arranged at the point where the opening of each chamber is arranged at the sparking time.

18. In a rotary internal combustion engine, the combination with a rotary piston having combustion chambers opening on its periphery, of a casing having fixed abutments extending partially around said piston, a series of movable overlapping abutments arranged at the point where the opening of each chamber is arranged at the sparking time, and resilient means for yieldingly holding said movable abutments in closed position upon one another until the explosion takes place.

19. In an rotary internal combustion engine, the combination with a rotary piston having combustion chambers opening on its periphery, of a casing having fixed abutments extending partially around said piston, an exhaust port with which said chambers are brought into communication after passing said fixed abutments, and a shoe plate arranged between said exhaust port and the fixed abutments, said shoe having an imperforate portion to close each of the chambers at the point where it is being charged, said shoe also having a slot arranged opposite the point where the opening in each chamber is positioned when the sparking takes place, and movable overlapping abutments in said slot in the shoe and normally but yieldingly retained in closed position upon one another.

20. In a rotary internal combustion engine, the combination with a rotary piston having combustion chambers opening on its periphery, of a casing having fixed abutments extending partially around said piston, an arcuate shoe engaging the periphery of the piston and having a plate portion to close the opening of each chamber when it is being charged, resilient means for pressing said shoe into contact with the piston, a series of hinged shutters carried by said shoe, means for yieldingly holding said shutters normally closed upon one another, and a corresponding series of fixed ribs on the casing against which said shutters contact to form the equivalents of the fixed abutments when the explosion takes place in each of the combustion chambers.

In testimony whereof, I have signed my name to this specification.

OTTO J. EISELE.